3,343,966
STABILIZER COMPOSITION AND METHOD OF IN-
CORPORATING A STABILIZER GUM INTO A
FOOD MIX
Morrison Loewenstein, Ashton, Ill., assignor to Crest
Foods Co., Inc., Ashton, Ill., a corporation of Illinois
No Drawing. Filed Nov. 20, 1963, Ser. No. 325,132
14 Claims. (Cl. 99—136)

ABSTRACT OF THE DISCLOSURE

Gum stabilizers are incorporated into food mixes, such as ice cream, by preparing a slurry of stabilizer in particulate form in a liquid carrier of water and oil to partially hydrate the stabilizer particles. The slurry is mixed into the food mix.

---

This invention relates to the making of food products containing fatty and nonfat constituents and particularly to the incorporation of a stabilizer in the food mix for the product.

A variety of stabilizers, known as such, are used as a constituent of many food products, particularly products which tend to change in physical character with time. Contemplated, for example, are salad dressings the aqueous and oily constituents of which tend to separate on standing, puddings which tend to become grainy on standing and a variety of frozen whipped foods, such as ice cream, ice milk, ice cream and ice milk custard, and sherbet, which contain ice crystals which tend to grow with time to cause graininess of the product. The stabilizers tend to inhibit such undesirable changes. In addition, important functions of stabilizers include the promotion of smoother, finer-grained food products and, in the case of the frozen whipped foods, the stabilizer tends to accelerate whipping to the desired overrun.

A wide variety of materials have been used as stabilizers. Although gelatin was used for many years, the present practice and the present invention contemplate the employment of one or a combination of several edible gums of vegetable origin, natural or synthetic. Those most commonly used include locust bean gum, guar gum, gum tragacanth, sodium alginate, carrageen and sodium carboxymethylcellulose. The gums used as stabilizers are hydrophilic, absorbing water readily and being completely dispersible in water, and they are organophobic, being insoluble in organic liquids such as edible oils and melted food fats.

The stabilizer gums are generally commercially available in the form of dry particles. Once incorporated in the food mix in the process of preparation of the food product, they absorb water and tend to increase the viscosity of the mix by thickening in some degree the aqueous constituent of the mix. However, it is difficult to properly incorporate the stabilizer material in the mix because of the tendency of the gum particles to agglomerate into lumps which are broken up and dispersed only with great difficulty. To meet this problem, and also to provide a pumpable liquid as required in the operation of modern automated manufacturing plants, stabilizer preparations have been suggested wherein the stabilizer material is suspended in a nonaqueous liquid in the form of a thin slurry which is added to the food mix and readily incorporated therein. With this technique, the stabilizer is introduced into the mix with substantially the same composition as the dry commercial stabilizer powder and the water absorption process begins only after the exposure of the stabilizer particles to the water in the food mix.

The object of this invention is to provide a novel and highly useful method for the incorporation of stabilizer gums into food mixes. A further object is to pretreat the stabilizer, coincidentally with the carrying out of the procedure for the ready incorporation of the stabilizer into the food mix, whereby to accelerate the action of the stabilizer in the mix to thereby reduce the time necessary for mixing the ingredients. Another object is to provide a method whereby the stabilizer may be suspended in a pumpable slurry so that it can be metered and pumped into the mixing apparatus.

Other objects and the advantages of the invention will become apparent as the detailed description thereof proceeds.

Although the following disclosure offered for public dissemination is detailed to ensure adequacy and aid understanding, this is not intended to prejudice that purpose of a patent which is to cover each new inventive concept therein no matter how others may later disguise it by variations in form or additions or further improvements. The claims at the end hereof are intended as the chief aid toward this purpose; as it is these that meet the requirement of pointing out the parts, improvements, or combinations in which the inventive concepts are found.

Briefly, the invention contemplates the incorporation of the dry stabilizer material in a liquid carrier consisting of aqueous and nonaqueous constituents and thereafter introducing the slurry of partially hydrated stabilizer gum thus produced into the food mix. As an example of a specific aspect of the invention, it comprises the incorporation of the stabilizer in melted butter, which normally contains about 15% to about 20% of water, to form a slurry which may be pumped to, for example, an ice cream mix vat for incorporation into the mix and dispersal of the already partially hydrated stabilizer in the continuous aqueous phase of the mix emulsion.

The following are given as typical examples of the food stabilizer compositions and methods of incorporating the same in food mixes pursuant to the invention:

*Example 1*

|  | Parts |
|---|---|
| Carboxymethylcellulose | 18 |
| Carrageen | 2 |
| Melted butter | 80 |

*Example 2*

|  | Parts |
|---|---|
| Locust bean gum | 9 |
| Guar gum | 9 |
| Carrageen | 2 |
| Emulsifier | 5 |
| Melted oleomargarine | 75 |

*Example 3*

|  | Parts |
|---|---|
| Gum | 20 |
| Emulsifier | 6 |
| Plastic cream (about 80% butterfat cream) | 74 |

The procedure in each instance is to mix the stabilizer and, if used, the emulsifier, into the liquid carrier. Mixing is easily accomplished because of the limited water content of the liquid carrier. Immediately upon exposure of the stabilizer gum particles to the water of the carrier, absorption of the water by the particles proceeds, first very slowly and then more rapidly with increasing hydration of the solid material until all of the water is thus absorbed. The result in each instance is a food stabilizer composition which is ready for introduction into the food mix in which it is to be used. In some instances, it may be desirable to maintain the temperature of the composition above the melting point of the fatty constituent of the carrier, especially if the material is to be pumped to the food mix vat.

Since the primary object of the invention involves the incorporation of the stabilizer gum in the food mix, it is usually desirable to incorporate as much as possible of the stabilizer in a given quantity of liquid carrier. The foregoing examples illustrate suitable proportions, by weight. The amount of stabilizer gum that can be worked into a given amount of liquid vehicle depends upon the peculiar characteristics of the particular stabilizer gum or gums and of the particular liquid carrier employed. Also, if a pumpable slurry is desired, less of the stabilizer gum can be incorporated in the composition. Sometimes, as in the case of the manufacture of ice cream, since butter is necessarily included as an ingredient of the mix, it is not important that the maximum proportion of stabilizer gum be incorporated in the melted butter carrier. The optimum proportions of carrier gum and liquid carrier may readily be determined for each process and food product.

The proportionate amount of water in the liquid carrier is limited by the physical condition of the stabilizer gum particles after the water constituent of the liquid carrier has been completely absorbed. Excessive water with consequent excessive hydration of the gum particles makes them so soft that they do not hold their shapes in the slurry but tend to deform and interfere with the mobility and therefore the handlability of the slurry. The proportions of water specified in the foregoing examples and in the appended claims, a range of 12% to 25%, have been found by experience to be satisfactory. The proportions are specified in percentages by weight.

It will be understood that the stabilizer-carrier composition of the invention and the novel method herein described for introduction of the stabilizer gums into food mixes not only provide convenient and efficient means for introducing the stabilizer into the mix but also contribute appreciably to the efficiency of the entire food product manufacturing operation in that the stabilizer, having been partially hydrated previous to its introduction into the mix, more rapidly disperses completely in the aqueous component thereof to permit immediate further processing of the mix. In the manufacture of ice cream, for example, aging of the ice cream mix is unnecessary and, in keeping with the requirements of automated production, the mix can be pumped directly to the freezers for whipping and freezing in the final steps of the manufacture of the ice cream product.

A variety of liquid carriers and stabilizer gums in addition to those herein mentioned by way of example may be employed. Such particular specification is not intended to limit the invention thereto, the scope of the inventive concept being defined by the appended claims.

Invention is claimed as follows:

1. A method of incorporating a hydrophilic organophobic stabilizer gum into a food mix comprising the steps of providing a liquid carrier comprising 12% to 25% water and 88% to 75% edible oil, mixing the stabilizer gum in dry particle form into the liquid carrier to form a slurry, permitting the gum to absorb the water of the liquid carrier, and introducing the slurry of partially hydrated stabilizer gum thus produced into the food mix.

2. A method of incorporating a hydrophilic organophobic stabilizer gum into a food mix comprising the steps of providing a liquid carrier comprising 12% to 25% water and 88% to 75% edible oil, mixing into the liquid carrier the approximately maximum quantity of stabilizer gum in dry particle form which when hydrated by absorption of the water of the liquid carrier produces a pumpable slurry, permitting the gum to absorb the water of the liquid carrier, and introducing the slurry into the food mix.

3. A method of incorporating a hydrophilic organophobic stabilizer gum into a food mix comprising the steps of heating to above the melting point of the fat constituent a normally substantially solid food product comprising 75% to 88% fat and 25% to 12% water to provide a liquid carrier, mixing the stabilizer gum in dry particle form with the carrier liquid, permitting the gum to absorb the water contained in the carrier liquid, and maintaining the temperature of the slurry of partially hydrated stabilizer gum thus produced above the melting point of the fat constituent of the carrier liquid while introducing the slurry into the food mix.

4. A method of incorporating a hydrophilic organophobic stabilizer gum into a food mix comprising the steps of mixing the stabilizer gum in dry particle form with melted butter containing from 15% to about 20% water, permitting the gum to absorb the water contained in the melted butter, and introducing a slurry of partially hydrated stabilizer gum thus produced into the food mix.

5. A method of incorporating a hydrophilic organophobic stabilizer gum into a food mix comprising the steps of mixing the stabilizer gum in dry particle form with plastic cream containing from about 12% to about 25% water, permitting the gum to absorb the water contained in the plastic cream, and introducing the slurry of partially hydrated stabilizer gum thus produced into the food mix.

6. A food stabilizer composition comprising a liquid edible oil carrier and discrete partially hydrated particles of solid stabilizer gum suspended therein, the amount of water contained in said stabilizer gum particles being such that they are appreciably hydrated but still substantially discrete whereby to form a pumpable slurry.

7. A food stabilizer composition in accordance with claim 6 wherein the liquid carrier initially comprises a water-in-oil emulsion containing from 12% to 25% water.

8. A food stabilizer composition in accordance with claim 6 wherein the liquid carrier initially comprises an oil-in-water emulsion containing from 75% to 88% oil.

9. A food stabilizer composition in accordance with claim 6 wherein the liquid carrier is melted butter.

10. A food stabilizer composition in accordance with claim 6 wherein the liquid carrier is melted oleomargarine.

11. A food stabilizer composition in accordance with claim 6 wherein the liquid carrier is plastic cream.

12. A food stabilizer composition in accordance with claim 6 wherein the amount of partially hydrated stabilizer gum contained in the liquid carrier is the maximum amount which produces a still pumpable slurry.

13. A food stabilizer composition in accordance with claim 6 wherein the degree of hydration of the partially hydrated stabilizer gum particles is the approximately maximum degree beyond which the particles tend to coalesce.

14. A food stabilizer composition comprising butter containing suspended therein partially hydrated discrete particles of stabilizer gum, the amount of gum being approximately the maximum proportionate amount, not less than about 20% of the stabilizer composition, which produces a still pumpable slurry when the composition is heated to above the melting point of the butterfat.

References Cited

Food Manufacture, Lecithin in Confectionery and Ice Cream, Feb. 1, 1941, p. 27.

Josephson et al., A New Cellulose Gum Stabilizer for Ice Cream, The Ice Cream Review, June 1945.

Leighton, Some Newer Ice Cream Stabilizers and Their Functions, The Ice Cream Trade Journal, December 1941, p. 13.

A. LOUIS MONACELL, *Primary Examiner.*

HYMAN LORD, *Examiner.*

M. VOET, *Assistant Examiner.*